United States Patent [19]

Goto et al.

[11] Patent Number: 5,551,693
[45] Date of Patent: Sep. 3, 1996

[54] CONTROLLER UNIT FOR ELECTRONIC DEVICES

[75] Inventors: Teiyu Goto, Saitama; Hiroki Ogata, Chiba, both of Japan

[73] Assignee: Sony Corporation, Tokyo, Japan

[21] Appl. No.: 436,728

[22] Filed: May 8, 1995

[30] Foreign Application Priority Data

May 9, 1994 [JP] Japan .................................. 6-094988
Oct. 3, 1994 [JP] Japan .................................. 6-238898

[51] Int. Cl.⁶ ........................................ A63F 9/22
[52] U.S. Cl. ........................................ 463/37; 345/169
[58] Field of Search .............................. 273/148 B, 438, 273/85, 434, DIG. 28; 345/156, 161

[56] References Cited

U.S. PATENT DOCUMENTS

| | | | |
|---|---|---|---|
| 4,469,330 | 9/1984 | Asher | 273/148 B |
| 5,207,426 | 5/1993 | Inoue et al. | 273/148 B |
| 5,294,121 | 3/1994 | Chiang | 273/148 B |

FOREIGN PATENT DOCUMENTS

| | | |
|---|---|---|
| 61-194231 | 12/1986 | Japan . |
| 5-87778 | 11/1993 | Japan . |
| 6-23148 | 2/1994 | Japan .................................. 273/438 |
| 6-17070 | 3/1994 | Japan . |
| 6-38137 | 5/1994 | Japan . |

*Primary Examiner*—Raleigh W. Chiu
*Attorney, Agent, or Firm*—Hill, Steadman & Simpson, A Professional Corporation

[57] ABSTRACT

A controller unit for controlling an electronic device such as a video game. The controller unit comprises a housing with a pair of handles diverging toward a user and gripped by the palms of the user, first and second control sections arranged on the top of the housing and each including a plurality of key elements, and third and fourth control sections arranged on the front side of the housing and each including upper and lower key elements. The first control section comprises a key body having a first semispherical recess on its bottom and a second semispherical recess on its top, a spherical fulcrum member located below the key body and engageable with the first recess, a base plate mounted in the housing and including fixed contacts, a resilient body disposed between the key body and the base plate and including movable contacts, and a key support centrally located at the key body and having a semispherical projection engageable with the second recess.

22 Claims, 10 Drawing Sheets

CONTROLLER UNIT FOR ELECTRONIC DEVICES

BACKGROUND OF THE INVENTION

1. Field of the Invention

The present invention relates to a controller for use in game machines and more particularly, to a controller unit adapted for three dimensional game applications.

2. Description of the Related Art

A known controller unit for game machines is disclosed, for example, in U.S. Pat. No. 5,207,426 and adapted for two dimensional game applications.

Referring specifically to FIG. 11, a controller unit 30 for game machines comprises, among others, a housing 31, a direction control section 32 as a first control means, a first action control section 37 as a second control means, a second action control section 39 as a third control means, a selector switch 30a, and a game start switch 30b.

In order to enable a user to readily hold the housing 31 by his hands, the housing 31 is ellipsoidal in shape with an elongated central recess in the lower or long side and is in the form of eyeglasses as viewed in plan.

The housing 31 has right and left arcuate portions. The direction control section or first control means 32 is situated at one of the arcuate portions (left side in FIG. 11) of the housing 31. The first action control section or second control means 37 is situated at the other arcuate portion (right side in FIG. 11) of the housing 31. The second action control section or third control means 39 is situated at one side of the housing 31 upwardly of the direction control section 32 and the first action control section 37.

The direction control section or first control means 32 is an integral switch and has four cross-shaped contacts, that is, upper, lower, right and left contacts.

The direction control section 32 is cross-shaped and has four ends on which triangular directional marks 33 are provided to enable the user to feel by his fingers in which direction an object is moved when each end is depressed.

As shown in FIG. 12, the direction control section 32 includes upper, lower, right and left ends or key elements 34 and corresponding contacts located below the key elements. Alternatively, the direction control section 32 may include a base 35, a plurality of mutually perpendicular key elements 36 on the base 35, and corresponding contacts below the key elements 36 through the base 35, as shown in FIG. 13. These arrangements are both known in the art.

As shown in FIG. 11, the first action control section or second control means 37 has four key elements 38a, 38b, 38c and 38d provided at the quandrants of a circle. Each of the key elements 38a, 38b, 38c and 38d is cylindrical in shape and extends from its base. These key elements 38a, 38b, 38c and 38d control action of the object in accordance with a program rather than the unit per se and are referred to as action switches to control A to D actions. To this end, marks A to D are present on the surfaces of the switches.

As shown in FIG. 11, the second action control section or third control means 39 includes a pair of elongated key elements 40a and 40b provided at one side of the housing and located upwardly of the direction control section 32 and the first action control section 37. The key elements 40a and 40b have a width smaller than the thickness of the housing.

The key elements 40a and 40b have one ends (adjacent to the central portion of the housing 31) supported by corresponding bearings (not shown) in the housing 31 and the other or free ends (at the right and left sides of the housing 31). The key elements 40a and 40b are curved from their one ends toward the other or free ends and extend along the arcuate sides of the housing 31.

In this controller unit 30, the key elements 38a, 38b, 38c and 38d of the first action control section 37 may be positioned mutually perpendicular to one another to selectively control up and down and right and left movement of the object in response to a given program.

That is, the controller unit 30 can be used to control movement in two different directions.

When the object in a game is, for example, a battle tank, the second action control section 39 is actuated to shoot a gun or launch a missile.

The first action control section 37 may be used as direction control means, whereas the up and down and right and left points of the direction control section 32 may be used as action control means. This arrangement enables a left-handed user to readily manipulate the controller unit if a game requires movement only in one direction.

The direction control section 32 includes a plurality of key elements (34 and 36) arranged in an integral fashion. Various other switches have also been proposed as follows.

Referring firstly to FIG. 14, Japanese laid-open utility model publication No. 61-194231 published on Dec. 3, 1986 discloses a direction control section 32A mounted to a housing 31A at a suitable position (for example, at 32 in FIG. 11). The direction control section 32A includes a key element 36A having key faces 42, a semispherical fulcrum member 41 extending centrally from the lower surface of the key element 36A, and a resilient body 44 connected to one side of the key element 36A opposite the key faces 42 and adapted to make electrical contact with the contact of a base plate 43. The key faces 42 of the key element 36A normally extend out of the top surface of the housing 31A under the action of the resilient body 44. When one of the key faces 42 is depressed, the fulcrum member 41 is brought into point contact with the base plate 43. Further depression of the key face 42 causes the key element 36A to pivot about the fulcrum member 41 in a selected direction. As a result, the resilient body 44 is flexed to cause a movable contact 45 adjacent to that key face to make electrical contact with a fixed contact 46 on the base plate 43. Thus, when any one of the key faces 42 is depressed, the key element is swung about the fulcrum member 41 in a selected direction to make electrical contact.

Referring secondly to FIG. 15, Japanese laid-open utility model publication No. 5-87778 published on Nov. 26, 1993 discloses a direction control section 32B mounted to a housing 31B at a suitable position (for example, at 32 in FIG. 11). The direction control section 32B includes a key element 36B with a semispherical recess 47 centrally formed in the bottom of the key element 36B, a semispherical recess 48 formed in the bottom of the housing 31B, a spherical body or ball bearing 49 received in the recesses 47 and 48, and a resilient body 44A having rubber contacts 50 at locations corresponding to key faces 42A of the key element 36B. With this arrangement, when the key face 42A of the key element 36B is depressed, the key element 36B is swung about the ball bearing 49 in a selected direction to press the rubber contact 50 of the resilient body 44A so as to make electrical contact.

Referring thirdly to FIG. 16, Japanese laid-open utility model publication No. 6-017070 published on Mar, 4, 1994 discloses a direction control section 32C mounted to a housing 31C at a suitable position (for example, at 32 in FIG. 11). The direction control section 32C includes a key element 36C having a central flat portion 51 at its bottom, a spherical ball 52 adapted to make contact with the flat portion 51, a base plate 43A mounted on the bottom of the housing 31C and having fixed contacts 46A, and a resilient body 44B disposed between the base plate 43A and the key element 36C and having movable contacts 45A. With such a switch mechanism, when a key face of the key element 36c is depressed, the flat portion 51 of the key element 36C is brought into contact with the ball 52.

Further depression causes the key element 36c to be swung about the ball 52 and inclined in a selected direction. As a result, the resilient body 44B is flexed to provide an electrical contact between the movable contact 45A and the fixed contact 46A. When the key element 36C is released, the key element 36C is returned to its home position under the action of the resilient body 44B and extends out of the housing 31C.

Referring fourthly to FIG. 17, Japanese laid-open utility model publication No. 6-38137 published on May 20, 1994 discloses a direction control section 32D mounted to a housing 31D at a suitable position (for example, at 32 in FIG. 11). The direction control section 32D includes a key element 36D with a semispherical recess 47D formed centrally in the bottom of the key element 36D, a base plate 43B mounted on the bottom of the housing 31D and having fixed contacts 46B, a resilient body 44B disposed between the key element 36D and the base plate 43B and having movable contacts 45B, and a spherical ball 52B placed centrally in the resilient body 44B and adapted to engage with the recess 47A of the key element 36D.

With this arrangement, when a key face of the key element 36D is depressed in a selected direction, the recess 47A is brought into contact with the ball 52B to provide a center axis. Further depression causes the key element 36D to pivot about the ball 52B in the direction in which the key face is depressed. As a result, the resilient body 44B is flexed to provide an electrical contact between the movable contact 45B and the fixed contact 46B.

However, such conventional controller units for game machines suffer from the following problems.

(1) The configuration of the housing is adapted for use in a game wherein movement is controlled in two ways. The key elements are mounted at a suitable position of the housing. In the prior art, the housing itself is supported by some of the fingers while the remaining fingers are used to manipulate the key elements. The prior art controller may function when a two dimensional game program is employed, but is unable to work with a three dimensional game program.

(2) The structure of the key elements is not suitable for use in a three dimensional programmed game.

(3) It is necessary to increase the number of key elements of a controller (microcomputer or similar devices) as game softwares become more sophisticated. If the key elements are arranged on the top of the controller, mainly the thumb is used to manipulate the key elements. This manipulation is complicated and cumbersome.

(4) The key elements used to control movement are cross-shaped or circular and may control oblique movement. However, it is not possible to identify a correct key element and provide accurate control of movement in vertical and lateral directions (X- and Y-axes directions) as well as in an oblique direction (Z-axis direction) when a sophisticated software is employed (5) The switches are adapted to control movement in response to softwares used. To this end, the switches are painted with different colors or assigned alphabetical letters such as A to D so as to indicate A to D actions. It is not possible to immediately identify which color or alphabetical letter indicates "YES" or "NO", but the "YES" and "NO" key elements are frequently used in a game.

(6) A plurality of integral key elements include a plurality of corresponding contacts. A spherical body is used to support the key elements. The key elements are swung about the spherical body to make electrical contact. The top of each key element extends from the housing. As such, the user is unable to positively identify subtle movement by the feel of his finger tips.

(7) The key elements are formed in an integral fashion. The key elements have a cross or circular shape. The fulcrum member is disposed only below the key elements. The key body extends from the housing and has its outer peripheral edge engaged with the opening in the housing. This arrangement makes the entire key elements shaky, causes offset and deformation of the key elements, and deteriorates the operability of the key elements.

Thus, the configuration of the housing, and the arrangement of the key elements must be modified in order to properly control movement of an object in a three dimensional game in accordance with a sophisticated software, particularly a three dimensional game program. Also, the structure of the key elements must be changed in order to control movement in a complicated and sophisticated manner.

SUMMARY OF THE INVENTION

In order to overcome the foregoing problems, there is provided a controller unit for game machines, which comprises a plurality of control sections and switches manipulatable by fingers, and a vertically separable housing with handles diverging from the housing and contacted with and supported by the palms of both hands of a user.

The housing includes first and second control sections. The first control section is arranged on the upper surface of the housing and connected to one of the handles. The second control section is arranged on the upper surface of the housing and connected to the other handle. The control sections are oriented substantially parallel to a surface on which the housing is placed. The housing also includes third and fourth control sections. The third and fourth control sections are arranged in the front side of the housing and located forwardly of the first and second control sections, respectively. The first control section includes a plurality of key elements in an integral fashion. The key elements each extend upwardly from the housing.

Also, there is provided a controller unit for game machines, which includes a vertically separable housing on which a control section is mounted. The control section comprises a first recess formed centrally in the bottom of a plurality of integral key elements, a fulcrum member located below and spaced a short distance away from the integral key elements, a resilient body adapted to urge the integral key elements upwards and including electric contacts, a second recess formed centrally in the top of the integral key elements, and a projection mounted to the housing and corresponding in location to the second recess.

The second recess and the projection have semispherical surfaces. The first recess has a semispherical surface, and the fulcrum member has a spherical surface. The housing has a substantially cross-shaped recess which corresponds in location to the integral key elements. The integral key elements are tapered toward the center of the substantially cross-shaped recess. The substantially cross-shaped recess includes marks adapted to indicate the functions of the respective integral key elements. The substantially cross-shaped recess is centrally processed to identify its center. The second control section includes a plurality of key elements, and the housing has a substantially cross-shaped recess which corresponds in location to the integral key elements. The second control section includes different marks or colors to indicate its functions. The third and fourth control sections extend from the front side of the housing. Each of the third and fourth control sections includes an upper control key and a lower control key.

By this arrangement, the controller unit for game machines according to the present invention is operated as follows.

The controller unit comprises a plurality of control sections and switches, and a vertically separable housing with a pair of handles diverging away from each other and toward a user and gripped by the palms of both hands of the user. This arrangement enables the user to freely use his fingers of the both hands to manipulate a plurality of key elements and improves the operability in a three dimensional game.

When the housing is placed on a flat surface, the control sections are oriented substantially parallel to that surface. This arrangement insures positive depression of the key elements not only when the housing is held by the palms of the both hands, but also when the housing is placed on a predetermined flat surface.

The first control section is arranged on the upper surface of the housing and connected to one of the handles, and the second control section is arranged on the upper surface of the housing and connected to the other handle. This arrangement enables the user to manipulate the key elements with the handles held by the palms of the both hands and thus, permits positive manipulation of the key elements.

The third and fourth control sections are mounted forwardly of the first and second control sections, respectively. This arrangement allows direction and action control in at least two ways and thus, playing of a sophisticated game in a three dimensional space.

The switches are provided between the first and second control sections. This arrangement enables the user to readily start a program and select the desired level of skill.

The first control section or a plurality of integral key elements separately extend above the housing. This arrangement enables the user to manipulate the plurality of key elements as if a switch is changed from on to off or vice versa and also, to readily identify the position of each key element by the fingers when the handles are gripped by the palms of the both hands.

The first control section or integral key elements extend separately and upwardly from the top of the housing. The key elements extend radially outwardly from the center or direction control section of the housing. A spherical or fulcrum member is located centrally below the bottom of the key body. The key elements are divided by the housing and are independently operable. This arrangement enables the user to identify the direction of movement of an object only by the feel of his fingers. Point contact between the fulcrum member and the integral key elements provides smooth switching operation.

The housing has a substantially cross-shaped recess or step which corresponds in location to the integral key elements of the first control section. This arrangement enables the user to determine positional relationship between the key elements by the feel of his finger tips.

The integral key elements of the first control section are tapered upwardly and outwardly from the center of the substantially cross-shape recess. This arrangement enables the user to readily identify the direction of each key element by the feel of his finger tips.

The substantially cross-shaped recess includes marks to indicate the function of each key element. This arrangement enables the user to identify the direction of movement of the object not only by the feel of his finger tips, but also visually by his eyes.

The substantially cross-shaped recess is processed to provide a center mark. This allows the user to identify the center of the key elements by the feel of his finger tips before depression or during operation and thus, to rapidly determine which one of the key elements is to be depressed.

The second control section includes a substantially cross-shaped recess in which a plurality of separate key elements are provided. Each of the key elements provides a specific function. This arrangement enables the user to determine positional relationship between the key elements only by his finger tips.

The key elements of the second control section include different marks or colors to indicate their functions. This allows the user to visually identify the function of each key element.

The third and fourth control sections project from the front side of the housing. This allows the user to manipulate the key elements by his fingers, as if he pulls the trigger of a gun, while his hands are gripping the handles.

The third and fourth control sections each include upper and lower key elements. For example, the index and third fingers of the both hands may be used to simultaneously manipulate these key elements.

The controller of the present invention thus constructed offers the following advantages.

The controller unit comprises a plurality of control sections and switches, and a vertically separable housing with a pair of handles diverging toward a user and gripped by the palms of both hands of the user. By this arrangement, it is possible to safely and accurately manipulate the key elements by the thumb, index and third fingers with the housing supported within the palms of the user, and also, improve the operability of the key elements in a three dimensional game.

When the housing is placed on a surface, the control sections are oriented substantially parallel to that surface. By this arrangement, it is possible to safely manipulate the key elements not only when the housing is gripped by the palms of the both hands, but also when the housing is placed on a predetermined flat surface since the key elements are substantially parallel to the flat surface.

The first control section is arranged on the upper surface of the housing and connected to one of the handles, and the second control section is arranged on the upper surface of the housing and connected to the other handle. By this arrangement, it is possible to manipulate the key elements by as many as ten fingers in a stable manner with the housing supported within the palms of the both hands.

The third and fourth control sections are mounted forwardly of the first and second control sections, respectively. By this arrangement, it is possible to sufficiently manipulate the key elements by as many as ten fingers with the housing supported within the palms of the both hands so as to control movement and action in at least two ways and thus, control movement of an object in a three dimensional space in a sophisticated manner.

The switches are provided between the first and second control sections. By this arrangement, it is possible to readily start a program and select the desired level of skill by using the fingers, particularly thumb, with the housing supported within the palms of the both hands.

The first control section or integral key elements separately extend upwardly from the top of the housing. It is thus possible to readily grip by the index fingers with the housing supported within the palms of the both hands and thus, provide high operability.

The housing has a substantially cross-shaped recess in which the integral key elements of the first control section is arranged. By this arrangement, it is possible to determine positional relationship between the key elements by the feel of the finger tips due to the difference in height between the key elements and the recess, with the housing supported within the palms of the both hands and thus, provide high operability.

The integral key elements of the first control section extend radially from the center of the housing (in four directions). The integral key elements also extend upwardly from the top of the housing. A spherical body or fulcrum member is located centrally below the bottom of the key elements or base. The key elements are separately arranged on the housing. By this arrangement, it is possible to reduce shakiness, offset and deformation of the key body and thus, improve the operability of the key elements. It is also possible to identify the direction of movement by the feel of the hands. Swing motion of the key elements through point contact enables smoother switching operation.

By reducing the shakiness, offset and deformation of the key body, it is possible to increase the service life of rubber contacts used to effect switching operation.

The integral key elements of the first control section are tapered from the center of the substantially cross-shape recess. By this arrangement, it is possible to identify each key element by the feel of fingers with the housing supported within the palms of the both hands.

The substantially cross-shaped recess includes marks to indicate the function of each of the integral key elements. By this arrangement, it is possible to identify each key element by the feel of the fingers as well as by the eyes of the user.

The substantially cross-shaped recess is processed to provide a center mark. By this arrangement, it is possible to identify the center of the key elements by the feel of the finger tips with the housing supported within the palms of the both hands.

The second control section includes a substantially cross-shaped recess in which a plurality of separate key elements are arranged. By this arrangement, it is possible to readily determine positional relationship between the key elements only by the finger tips with the housing supported within the palms of the both hands.

The key elements of the second control section include different marks or colors adapted to indicate their respective functions. It is thus possible to visually identify the function of each key element with ease, if a larger number of key elements are employed to control movement within a three dimensional space.

The third and fourth control sections project from the front side of the housing. By this arrangement, it is possible to rapidly manipulate the key elements by free fingers with the handles supported within the palms of the both hands.

The third and fourth control sections each include upper and lower key elements. By this arrangement, it is possible to rapidly manipulate the key elements by the index, third or other fingers with the housing supported within the palms of the both hands.

BRIEF DESCRIPTION OF THE DRAWINGS

The present invention will now be described by way of example with reference to the accompanying drawings in which.

DETAILED DESCRIPTION OF PREFERRED EMBODIMENTS

Figure 1:
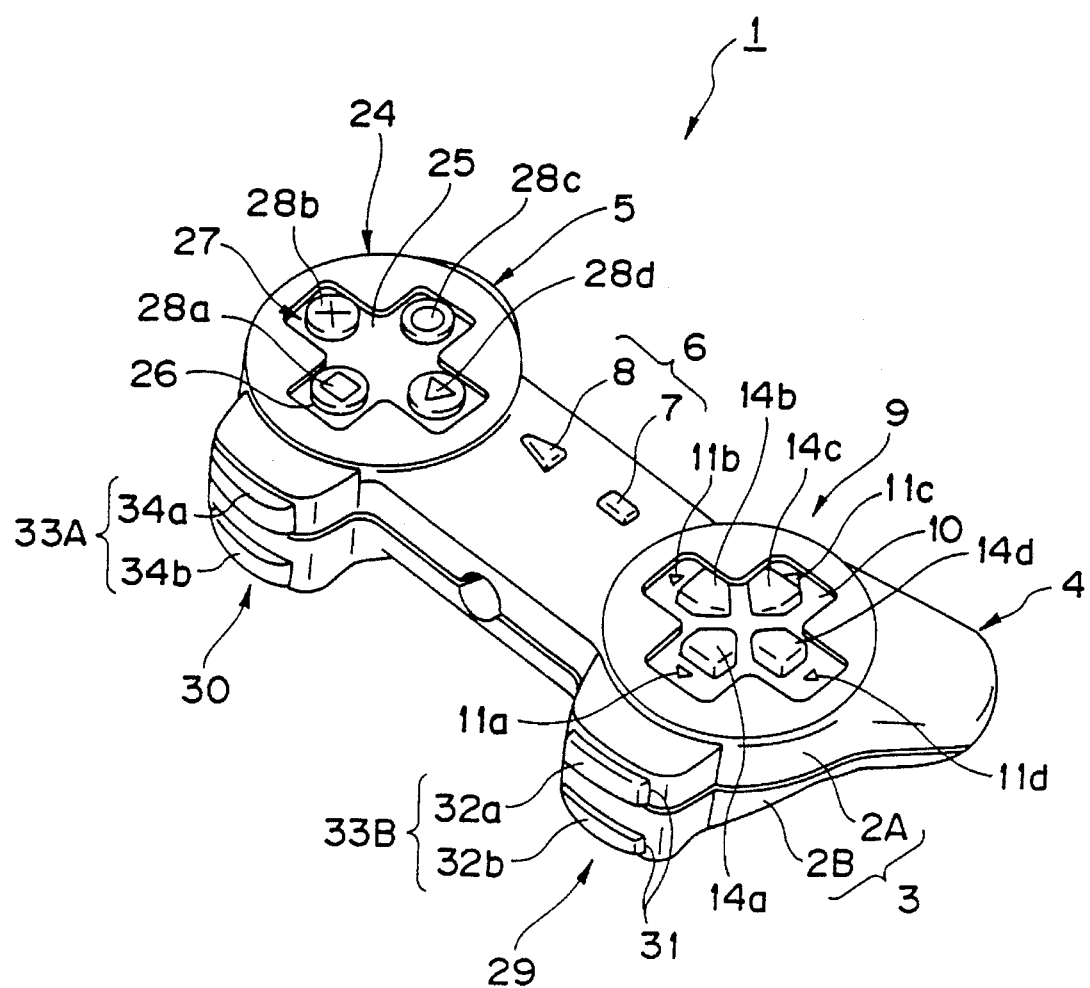
FIG. 1 is a perspective view of a controller unit for game machines, according to the present invention.

Referring to FIG. 1, there is shown a controller unit 1 for game machines, according to one embodiment of the present invention. The controller unit 1 is in the form of eyeglasses and comprises a vertically separable housing 3 composed of an upper housing half 2A and a lower housing half 2B and including a first grip 4 and a second grip 5 extending from opposite longitudinal ends of the housing and held by the palms of the both hands of a user, a start/selector switch section 6 provided at the narrow center of the housing 3 and adapted to start a game and select the desired level of skill, first and second circular control sections 9 and 24 symmetrically provided at opposite ends of the housing 3 and including a plurality of switches, and third and fourth control sections 29 and 30 symmetrically provided at the front side of the housing 3 and including a plurality of switches manipulatable by the index and third fingers of the user.

The first grip 4 and the second grip 5 serve as a handle to enable the user to hold the controller unit 1 by the palms of the both hands. The first grip 4 and the second grip 5 extend rearwardly and downwardly from opposite longitudinal ends of the housing 3 and diverge toward the user at an angle of approximately 45 degrees. The first grip 4 and the second grip 5 are thus in the form of horns and collectively form a handle.

Figure 2:
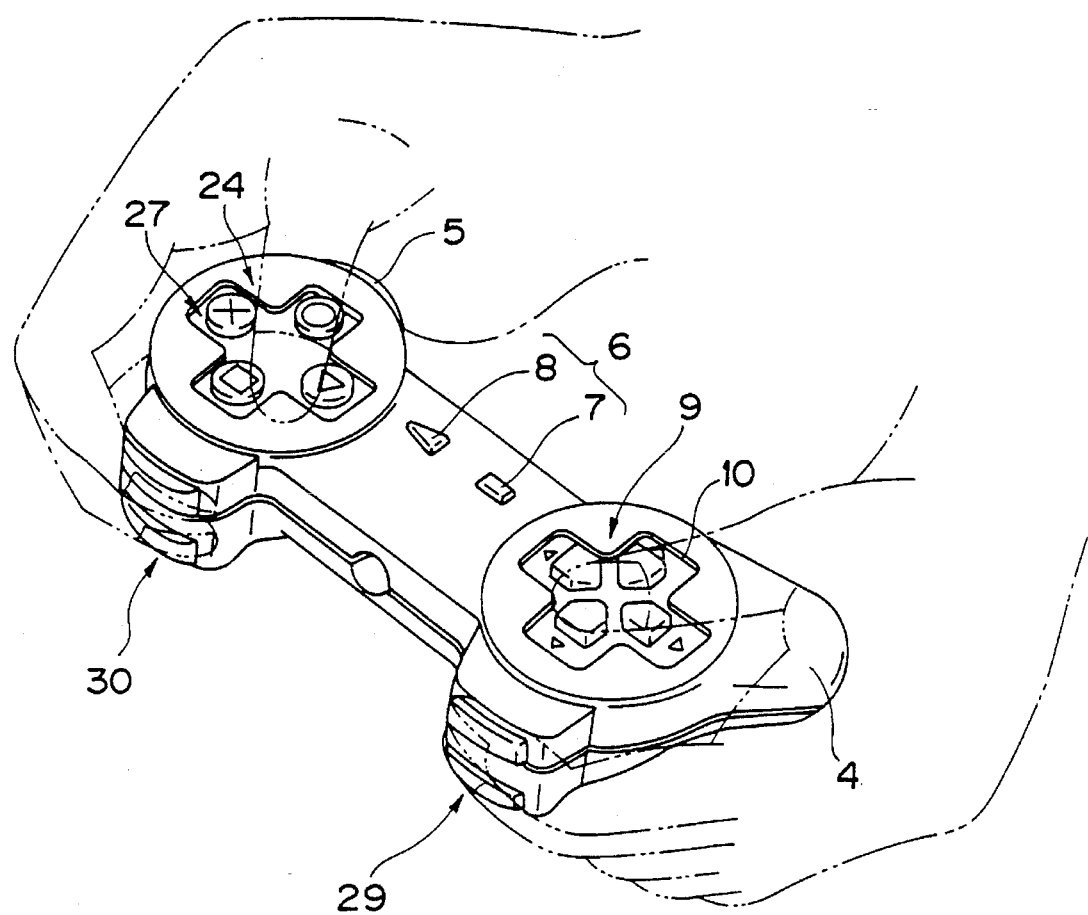
FIG. 2 is a perspective view of the controller unit shown in FIG. 1, with the unit held by the palms of the both hands of a user and manipulated by the user's fingers.

As shown better in FIG. 2, this arrangement enables the user to hold the controller unit by the palms of his hands and eliminates the need to hold the housing 3 by his finger tips. The user is able to manipulate the unit by as many as ten fingers. For example, the first and second control sections 9 and 24 may be operated by the thumbs of the left and right hands, respectively, while the third and fourth control sections 29 and 30 may be operated by the index and third fingers of the left and right hands, respectively.

Figure 5:
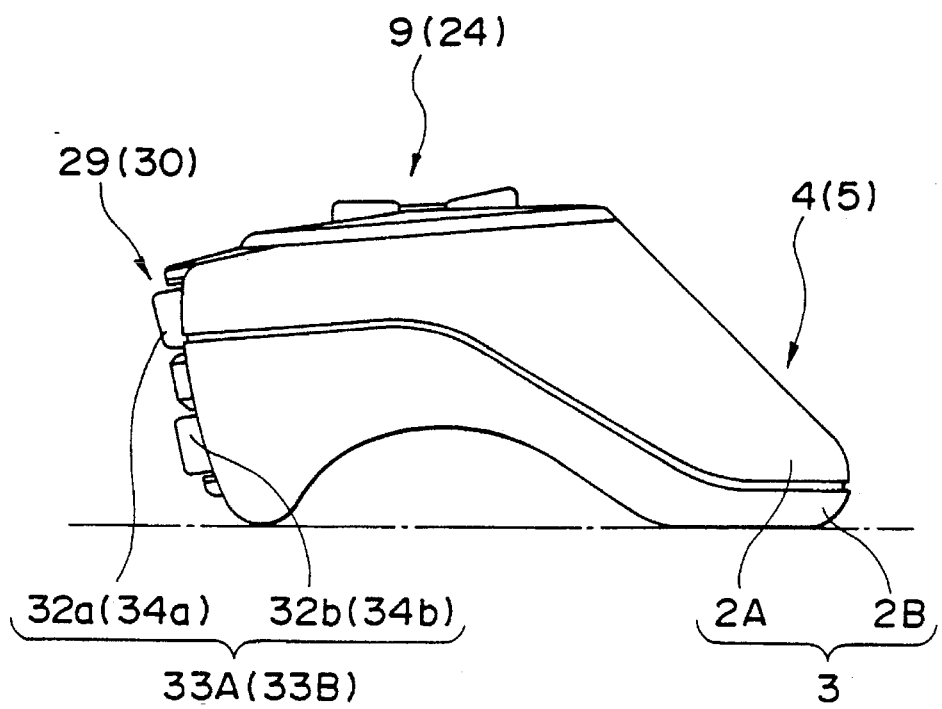
FIG. 5 is a side view of the controller unit as viewed from a first control section.

As shown particularly in FIG. 5, the control sections can be operated with the housing 3 placed on a flat surface. In such a case, it is not necessary to hold the housing 3 by the palms of the right and left hands.

More specifically, when placed on a predetermined surface (as shown by imaginary line in FIG. 5), the housing 3 is supported at four points, that is, the bottom of each of the third and fourth control sections 29 and 30 and the bottom of each of the first and second grips 4 and 5. In this state, the switches of the first and second control sections 9 and 24 extend substantially parallel to the surface on which the housing rests or, more specifically, is slightly inclined downwards.

The control sections can safely be operated when the housing 3 is placed on a predetermined flat surface as well as when the housing 3 is held by the palms of the hands of the user.

Figure 3:
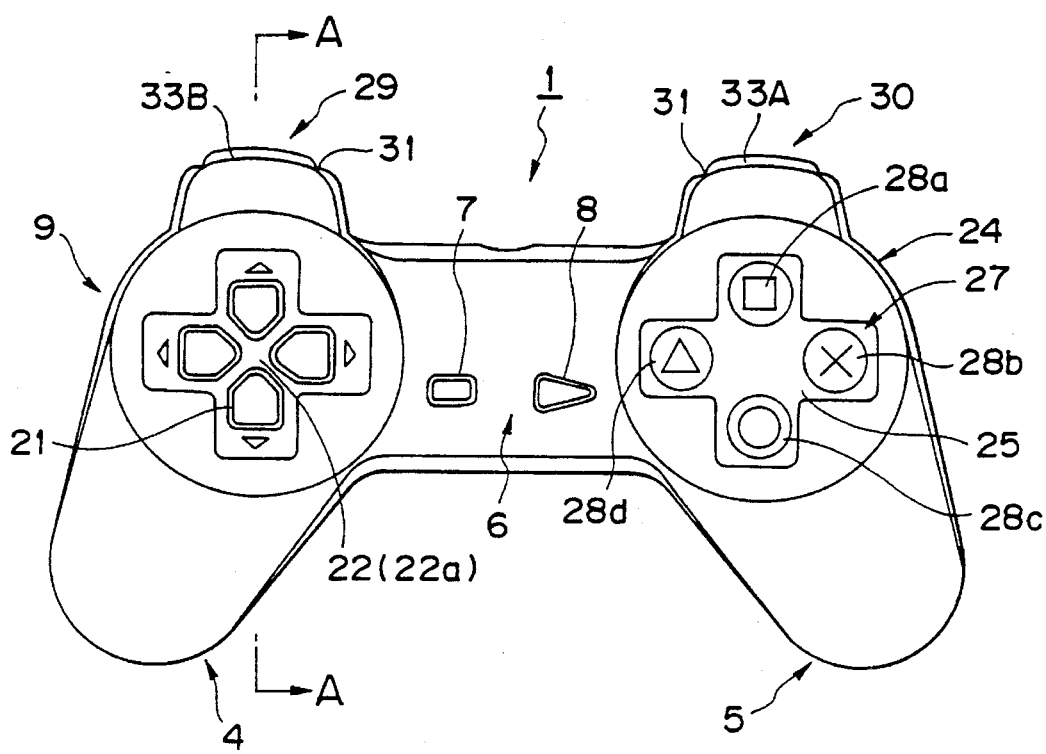
FIG. 3 is a top plan view of the controller unit shown in FIG. 1.

Referring to FIG. 3, the start/selector switch section 6 is a switch located between the first control section 9 and the second control section 24 and comprises a selector switch 7 and a start switch 8. The selector switch 7 is used to select, for example, the desired level. of skill. The start switch 8 is used to start a game.

Figure 6:
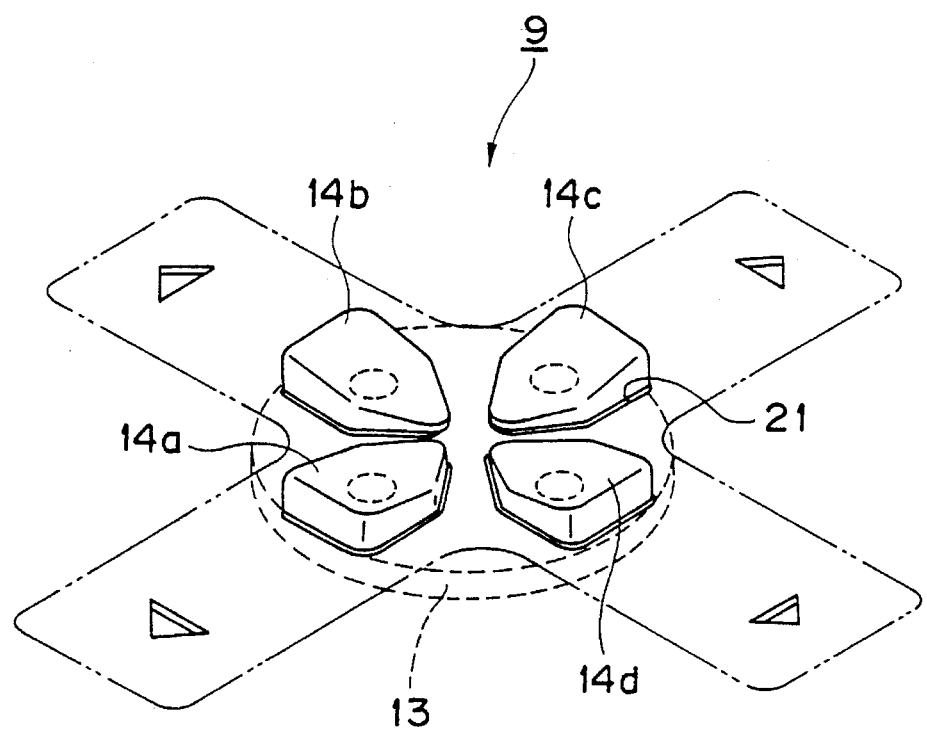
FIG. 6 is a perspective view, on an enlarged scale, showing the principal part of the first control section.
Figure 7:
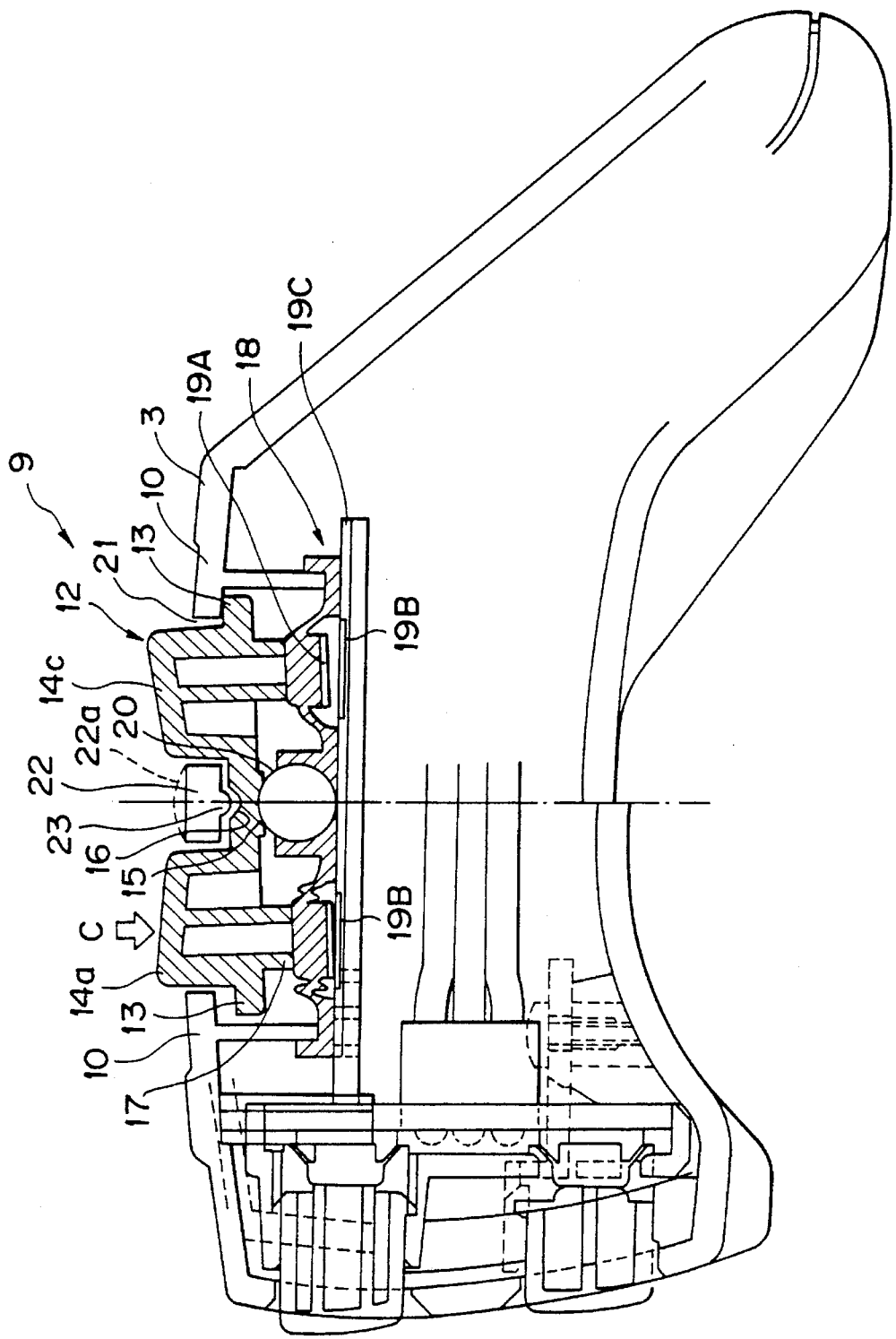
FIG. 7 is a sectional view taken on the line A—A in FIG. 3 with a key element depressed in a forward direction.

Referring to FIGS. 1, 6 and 7, the first control section 9 includes a substantially cross-shaped recess 10 formed in one circular end (right end in FIGS. 1 and 2) of the housing 3, four marks 11a, 11b, 11c and 11d formed on the upper, lower, right and left ends of the recess 10 and adapted to indicate the direction in which an object is moved, and an integral key body 12 having four key elements which are located inwardly of the corresponding marks 11a to 11d and separately extend through four corresponding openings.

The first control section 9 also includes four openings 21 having a shape complimentary to the shape of each of the key elements 14a, 14b, 14c and 14d of the key body 12 and directed to the center of the key body 12, a central key support 22 surrounded by the openings 21, a semispherical projection 23 extending centrally from the central key support 22, a resilient body 18 having four movable contacts 19A, a spherical fulcrum member 20 located at the center of the four key elements 14a to 14d and adapted to journal the key body, and a circuit board 19C having four fixed contacts 19B in confronting relation to the movable contacts 19A.

Referring to FIGS. 6 and 7, the key body 12 includes a circular base 13, the four key elements 14a, 14b, 14c and 14d integrally formed in the upper surface of the base 13, a semispherical first recess 15 formed centrally in the lower surface of the base 13 and adapted to engage with the fulcrum member 20, a semispherical second recess 16 formed centrally in the upper surface of the base 13 and adapted to engage with the projection 23 of the central key support 22, and a contact guide 17 extending downwardly from the base 13 and adapted to press the rear surfaces of the movable contacts 19A.

As shown better in FIG. 6, each of the four key elements 14a to 14d extends from the upper surface of the base 13 and has a pentagonal shape. Each key element is also tapered and has a thickness which increases from the center of the base 13 toward the outer periphery of the base 13. The key elements 14a to 14d of the key body separately extend upwardly from the housing 3 through the openings 21.

The resilient body 18 is disposed between the board 19C and the key body 12. The movable contacts 19A of the resilient body 18 correspond in number to the key elements 14a to 14d and are rubber contacts.

The fulcrum member 20 is spherical in shape, is placed at the center of the key body 12, and corresponds in location to the central key support 22. The fulcrum member 20 is engaged with the first recess 15.

With the key body 12 mounted in the housing, each of the key elements extends radially from the central key support 22. Each of the key elements has a pentagonal shape. A part of the key element adjacent to the central key support has a height such that the user may feel by his fingers the difference in height between the key element and the central key support 22. The key element has a height which increases in a direction away from the central key support 22.

When the user puts his finger on the center (that is, central key support 22) of the first control section 9, he may readily determine the positional relationship by his finger tip because there is a difference in height between the center of the first control section and the key elements. Each of the top surface of the key elements 14a to 14d has a height which gradually increases in a direction away from the center of the first control section. This configuration readily guides the finger tip of the user and enables the user to identify which one of the key elements is pressed when the user slides his finger tip from the inner end toward the outer end of each key element.

In the illustrated embodiment, the central key support 22 at the center of the first control section has a flat top. Alternatively, it may have a round top 22a, as shown by broken line in FIG. 7, so as to enable the user to readily identify the central key support 22 by his finger. Still alternatively, it may have a groove or a projection.

Figure 8:
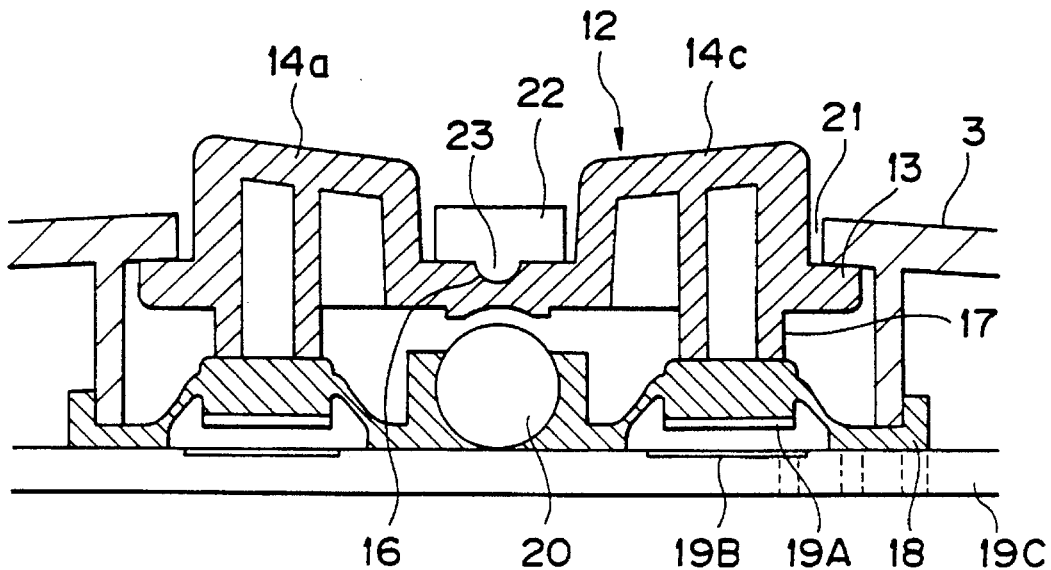
FIG. 8 is a sectional view taken on the line A—A in FIG. 3 with the key element in a home position.

When the first control section 9 is not in use, the resilient body 18 urges the contact guide 17 and thus, the key body 12 upwards so as to bring the semispherical second recess 16 of the key body 12 into engagement with the semispherical projection 23 of the central key support 22 as shown in FIG. 8. At this time, the circular edge of the base 13 is engaged with the edge of the opening 21. This is the home position of the key body 12 wherein the key elements 14a to 14d extend out of the housing 3.

Figure 9:
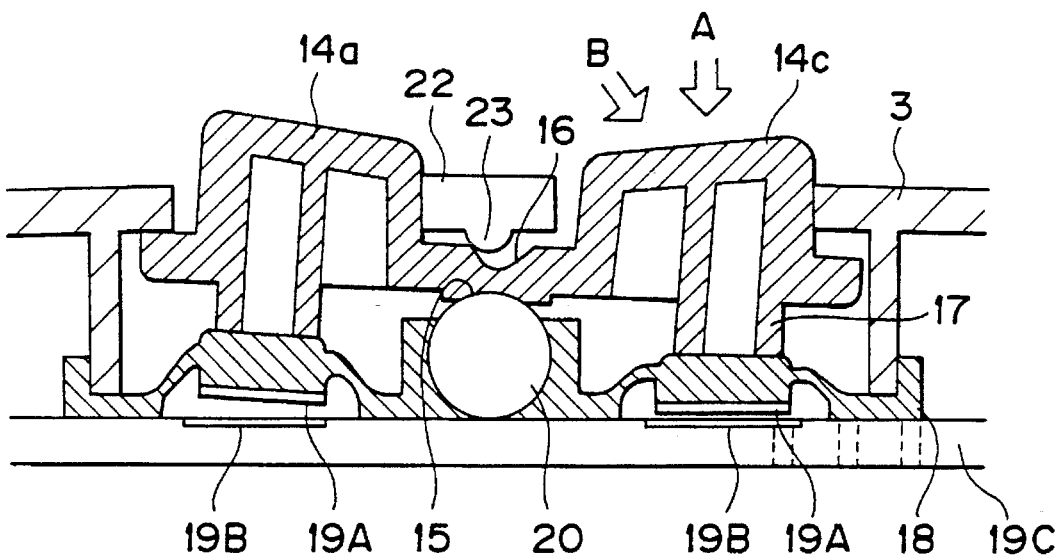
FIG. 9 is a sectional view taken on the line A—A in FIG. 3 with the key element depressed in a rearward direction.

When the key element 14c, for example, is depressed in the direction of the arrow A or B as shown in FIG. 9, the first recess 15 of the key body 12 is brought into engagement with the spherical fulcrum member 20. The key body 12 is then slid on the spherical surface of the fulcrum member 20 to the right in FIG. 9 so as to press down the resilient body 18. As a result, the resilient body 18 is flexed to cause the movable contact 19A to be moved closer to the fixed contact 19B below this movable contact 19A.

Figure 10:
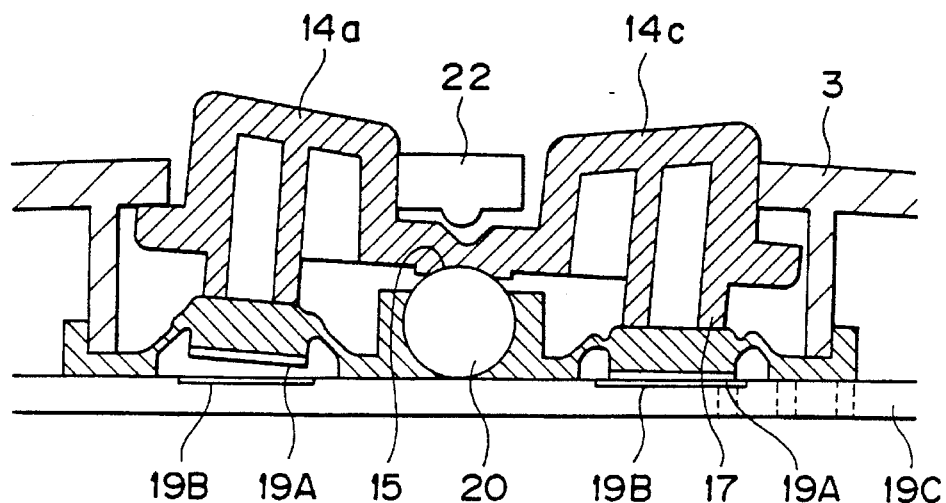
FIG. 10 is a sectional view taken on the line A—A in FIG. 3 with the key element depressed in a rearward direction.
Figure 11:
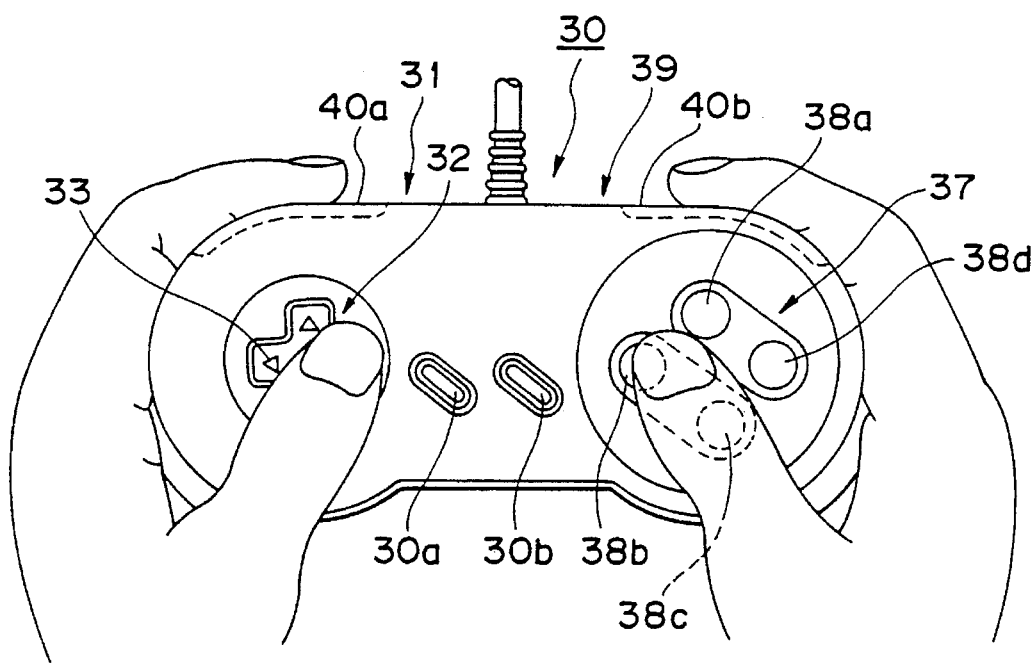
FIG. 11 is a top plan view of a conventional controller unit for game machines in use.
Figure 12:
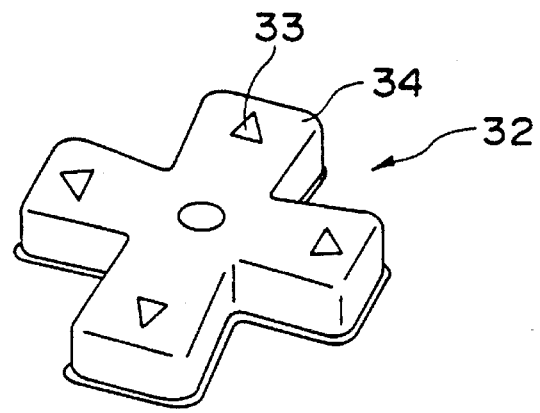
FIG. 12 is a perspective view showing the principal part of a direction control section shown in FIG. 11.
Figure 13:
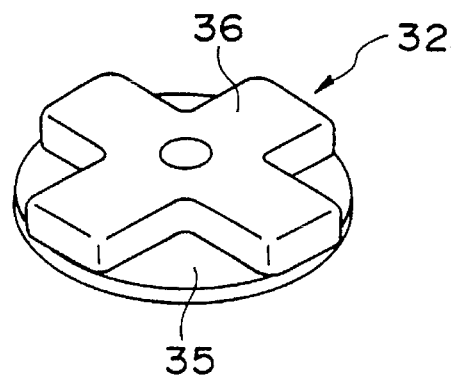
FIG. 13 is a perspective view showing the principal part of a modified direction control section.
Figure 14:
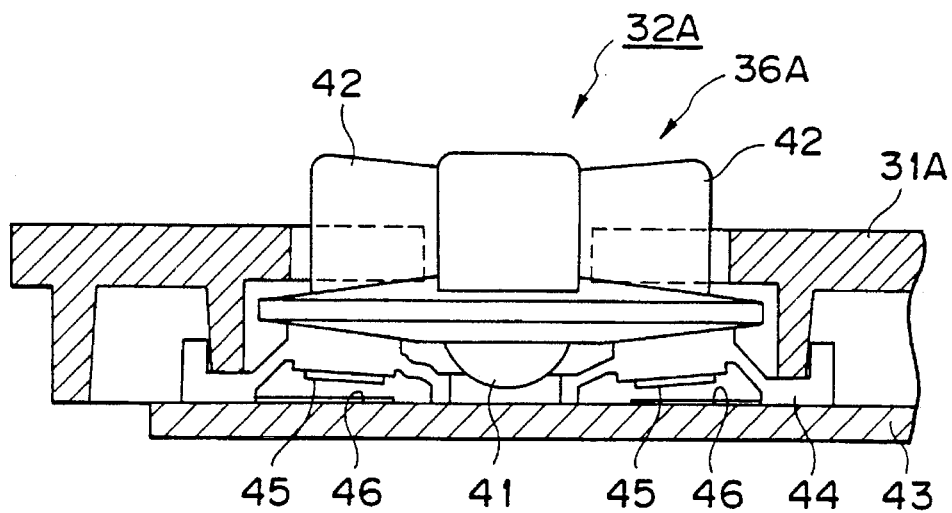
FIG. 14 shows a first example of the direction control section.
Figure 15:
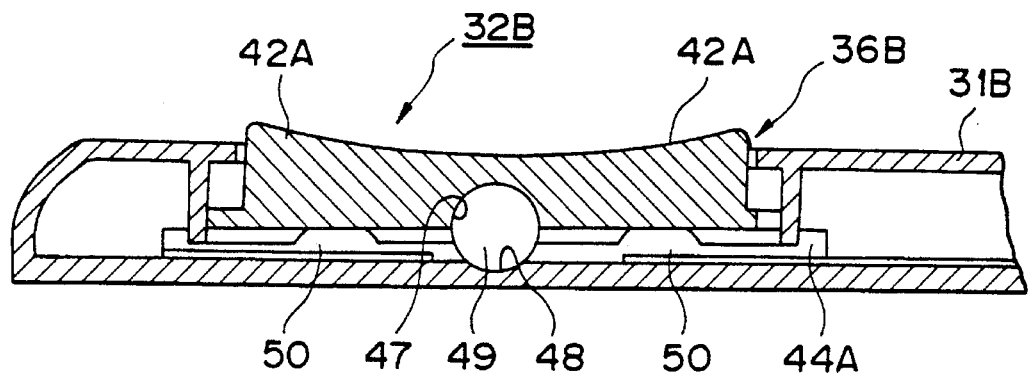
FIG. 15 shows a second example of the direction control section.
Figure 16:
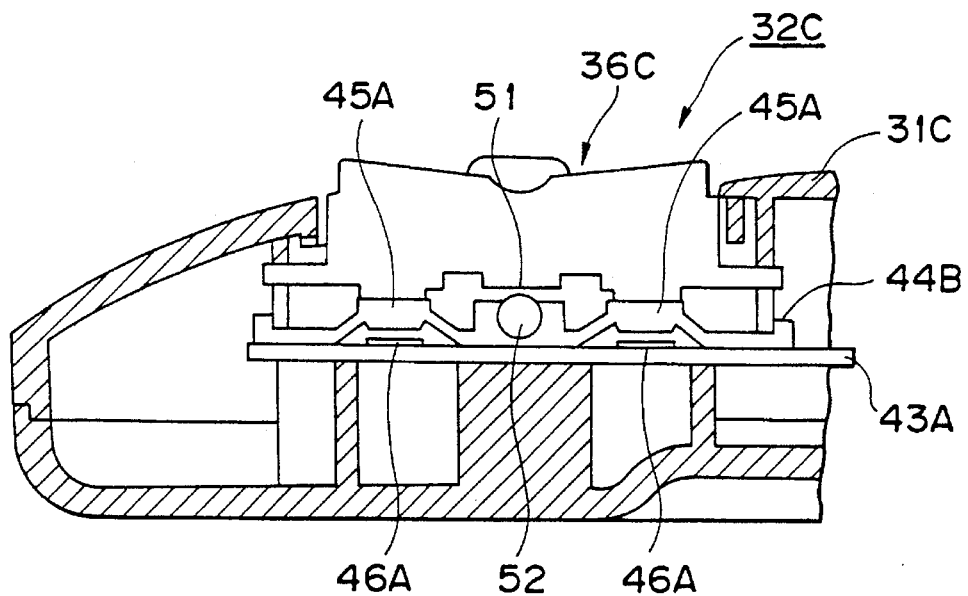
FIG. 16 shows a third example of the direction control section.
Figure 17:
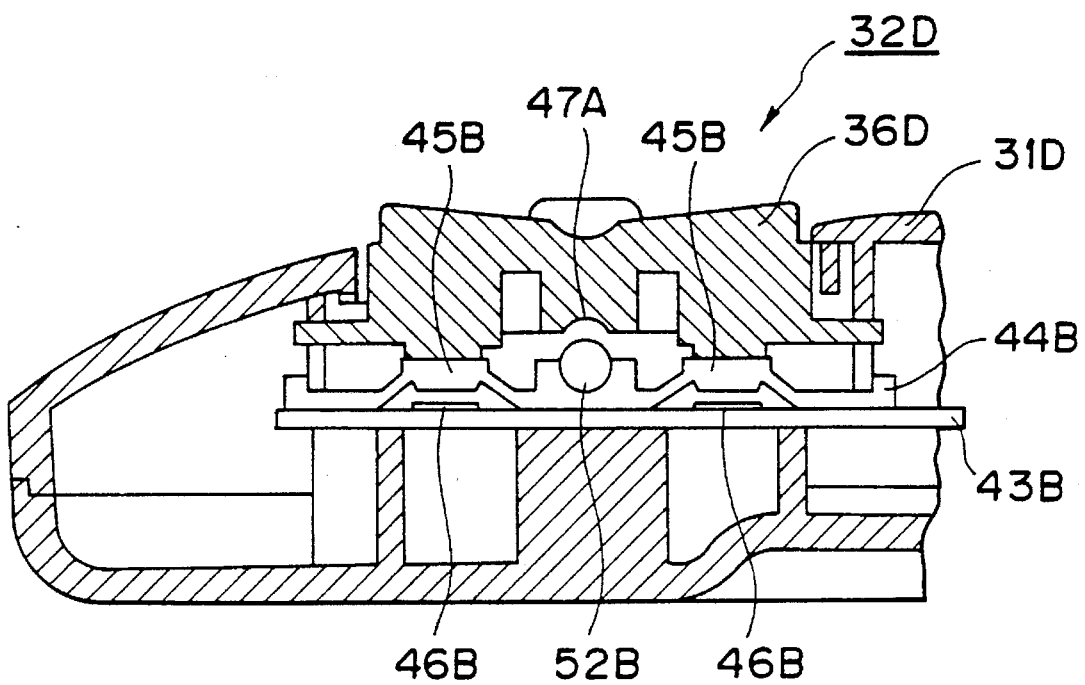
FIG. 17 shows a fourth example of the direction control section.

As shown in FIG. 10, the first recess 15 of the key body 12 continues to be slid on the spherical surface of the fulcrum member 20 on further depression of the key element 14c. This results in electrical contact between the movable contact 19A and the fixed contact 19B.

When the key element 14c is released, the first recess 15 is moved away from the spherical fulcrum member 20 under the action of the resilient body 18. That is, the key element 14c is swung to the left in FIG. 10. As a result, the movable contact 19A is separated from the fixed contact 19B (FIG. 9). The second recess 16 is then brought into engagement with the projection 23. Finally, the key element 14c is returned to its home position (FIG. 8) while it is rotated in a counterclockwise direction.

As shown in FIG. 7, when the key element 14a is depressed in a forward direction (in a direction indicated by C in FIG. 7), the resilient body 18 is flexed to cause the first recess 15 to be slid on the spherical surface of the fulcrum member 20. As a result, the key element 14a is moved forwardly and downwardly to make electrical contact. This operation is identical to that described with reference to FIGS. 8 to 10 and will not be described herein.

The key elements in the first control section are journaled on the fulcrum member 20 and are so swung as to make electrical contact, with the spherical recess and the spherical fulcrum member being in contact with one another. As the key elements 14a to 14d are separately arranged in the housing, they can be depressed in any direction rather than only in one direction. This enables smooth switching operation and prevents shakiness, offset and deformation of the key body 12.

Reference will now be made to the second control section 24. Referring specifically to FIGS. 1 and 2, the second control section 24 comprises a substantially cross-shaped recess 25 formed in the other, circular end (left end in FIGS. 1 and 2) of the housing, four openings 26 formed in the upper and lower and right and left ends of the cross-shaped recess 25, and a first action control switch 27 including four cylindrical key elements 28a, 28b, 28c and 28d which extend upwardly through the corresponding openings 26.

As shown better in FIG. 3, the first action control switch 27 includes four separate, up and down and right and left switches located in the corresponding ends of the cross-shaped recess 25. The key elements 28a to 28d correspond to these switches and extend slightly upwardly from the surface of the recess 25.

The key elements 28a to 28d each include marks such as a square mark, a cross mark, a circular mark and a triangular mark, so as to allow ready identification of their functions.

In the illustrated embodiment, the upper key element 28a, the right key element 28b, the lower key element 28c and the left key element 28d are assigned a square mark, a cross mark, a circular mark, and a triangular mark, respectively.

The circular and cross marks are assigned to particular key elements which are most easily manipulated by the right hand of the user in accordance with given programmed instructions and which are subject to frequent use. This arrangement enables the user to readily identify a minimum number of necessary switches to determine whether the answer is "YES" or "NO" even if a large number of switches are provided.

In order to differentiate the housing 3 from the key elements, the key elements may be colored.

Reference will next be made to the third and fourth control sections 29 and 30. Referring to FIGS. 1 to 3, the third and fourth control sections 29 and 30 each include upper and lower elongated openings 31 extending in parallel to one another and formed in the projected front side of the housing forwardly of the first and second control sections 9 and 24, respectively, and second action control switches 33A and 33B having elongated key elements 32a and 32b and 34a and 34b, respectively which are fitted within and extend forwardly through the respective openings 31.

Figure 4:
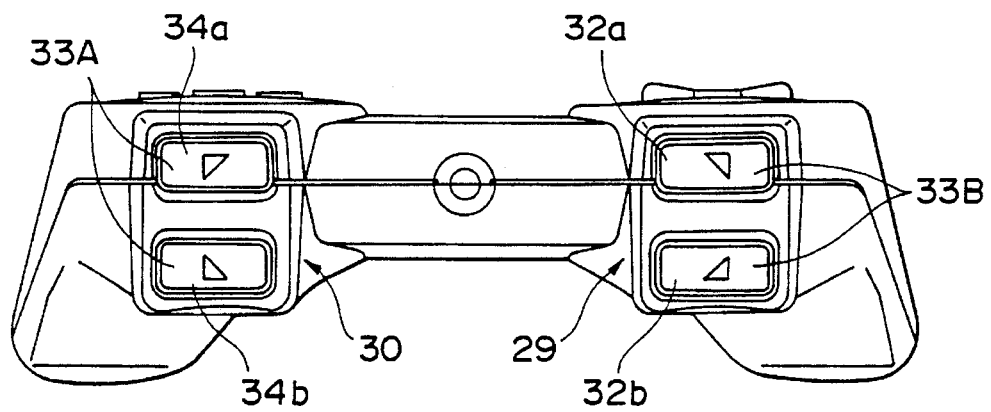
FIG. 4 is a front view of the controller unit shown in FIG. 1.

Referring to FIGS. 4 and 5, the second action control switches 33A and 33B are switches for the third and fourth control sections 30 and 29 provided on the front side of the housing 3. As shown better in FIG. 4, the second action control switches 33A and 33B are laterally symmetrical and include a pair of parallel upper and lower key elements 34a and 34b and a pair of parallel upper and lower key elements 32a and 32b, respectively. Thus, there are provided a total of four switches. These four switches are assigned a right-up mark, a right-down mark, a left-up mark, and a left-down mark, respectively to indicate the directions in which the object can be moved.

The right-up key element 34a and the right-down key element 34b can be manipulated simultaneously by the index and third fingers of the right hand, respectively, while at the same time, the left-up key element 32a and the left-down key element 32b can be manipulated simultaneously by the index and third fingers of the left hand, respectively. However, it is not necessary to manipulate the key elements 32a, 32b and 34a, 34b by these fingers. Alternatively, the index fingers of the right and left hands of the user may be used to manipulate the key elements 32a and 34a as well as the key elements 32b and 34b.

Again, the first, second, third and fourth control sections 9, 24, 29 and 30 can be manipulated simultaneously by as many as ten fingers of the both hands, while the first and second grips 4 and 5 are held by the palms of the both hands. These control sections can be manipulated only by one hand or a combination of one hand and both hands. Accordingly, the present invention has improved operability and is adapted for use in a complicated video game wherein an object is moved in a three dimensional space.

In the controller unit 1 with high operability, the user can enjoy virtual reality through a three dimensional game by operating the controller unit 1 with the first, second, third and fourth control sections 9, 24, 29 and 30 singly or in any combination.

Thus, the present invention is particularly suitable for use in three dimensional games including airplanes or submarines as objects.

For example, an airplane is moved forward while being rotated in a clockwise direction when the key element 14a of the first control section 9 and the right-down key element 32b of the fourth control section are both depressed.

When the key elements 14a and 14b of the first control section 9 are simultaneously depressed, and also, the right-up key element 32b of the third control section 29 is depressed, the airplane is moved to the right while being rotated in a clockwise direction.

When the key element 14a of the first control section 9, the right-up key element 32a of the third control section 29, and the left-up key element 34a of the fourth control section 30 are simultaneously depressed, the airplane is moved up. If all of these key elements continue to be depressed, the airplane can be rotated while being moved up.

16 modes of operation are possible by depressing the four integral key elements 14a to 14d of the first control section 9 singly or in any combination. Also, 16 modes of operation are possible by depressing the two independent key elements 32a and 32b of the third control section 29 and the two key elements 34a and 34b of the fourth control section 30 singly or in any combination. Thus, a total of 256 modes of operation in a three dimensional space are possible.

This arrangement is effective to move an object in a battle or similar games in a three dimensional fashion. For example, the right-up key element 32a of the third control section 29 and the left-up key element 34a of the fourth control section 30 are depressed by the index fingers of the both hands so as to move the upper half of the object, particularly, hands, while the right-downkey element 32b and the left-down key element 34b are depressed by the third fingers of the both hands so as to move the lower half, of the object, particularly, legs. This enables the object to not only kick an opponent by his legs or hands, but also move in a complicated or three dimensional manner. It is, of course, to be understood that the key elements 32a, 32b, 34a and 34b may be manipulated only by the index finger.

The present invention allows the use of programs prepared for existing two dimensional games as well as for three dimensional games. With the housing supported by the palms of the both hands, as many as ten fingers can freely be used to move the object in a three dimensional space in accordance with a complicated program.

The present invention is not limited to the foregoing embodiments. It is, of course, to be understood that the key elements may be modified in accordance with a given game program.

What is claimed is:

1. A controller unit for controlling electronic devices, comprising:
    a housing;
    a plurality of control sections mounted to said housing to be manipulated by fingers of a user; and
    a pair of handles diverging from each other in a direction from said housing toward the user, said diverging handles to be contacted with and supported by palms of both hands of the user, said housing, said handles and said control sections sized and arranged to allow manipulation of the control section by the user' fingers while the housing is supported by said handles in the user's palms.

2. A controller unit according to claim 1, wherein said plurality of control sections includes first and second control sections, said first control second being arranged on the upper surface of said housing and connected to one of said pair of handles, and said second control section being arranged on the upper surface of said housing and connected to the other handle.

3. A controller unit according to claim 2, wherein when said housing is placed on a surface, said plurality of control sections are oriented substantially parallel to said surface on which said housing is placed.

4. A controller unit according to claim 2, wherein said plurality of control sections includes third and fourth control sections, said third and fourth control sections being arranged in a front side of said housing and located forwardly of said first and second control sections, respectively.

5. A controller unit according to claim 4, wherein said second control section includes a plurality of key elements, and said housing has a substantially cross-shaped recess which corresponds in location to said plurality of key elements.

6. A controller unit according to claim 4, wherein said third and fourth control sections extend from the front side of said housing.

7. A controller unit according to claim 6, wherein each of said third and fourth control sections includes an upper control key and a lower control key.

8. A controller unit according to claim 2, wherein said first control section includes a plurality of key elements each extending upwardly from said housing.

9. A controller unit according to claim 8, wherein said second control section includes a plurality of key elements, and said housing has a substantially cross-shaped recess which corresponds in location to said plurality of key elements.

10. A controller unit according to claim 9, wherein said second control section includes different marks or colors to indicate its functions.

11. A controller unit according to claim 2, wherein said second control section includes a plurality of key elements, and said housing has a substantially cross-shaped recess which corresponds in location to said plurality of key elements.

12. A controller unit according to claim 1, wherein said housing provides a top surface and said control sections comprises two thumb activated switches arranged spaced apart on said top surface, each adjacent one handle, and said handles extend in a direction obliquely downwardly from said top surface.

13. A controller unit for controlling an electronic device, said electronic device including a housing on which a control section is mounted,
    said control section comprising:
    an integral plurality of key elements;
    a first recess formed centrally in the bottom of said integral plurality of key elements;
    a fulcrum member located below and spaced a short distance away from said integral plurality of key elements;
    a resilient body adapted to urge said integral plurality of key elements upwards and including electric contacts;
    a second recess formed centrally in the top of said integral plurality of key elements; and
    a projection mounted to said housing and corresponding in location to said second recess.

14. A controller unit according to claim 13, wherein said second recess and said projection have semispherical surfaces.

15. A controller unit according to claim 13, wherein said first recess has a semispherical surface, and said fulcrum member has a spherical surface.

16. A controller unit according to claim 15, wherein said housing has a substantially cross-shaped recess which corresponds in location to said integral plurality of key elements.

17. A controller unit according to claim 16, wherein said integral plurality of key elements are tapered toward the center of said substantially cross-shaped recess.

18. A controller unit according to claim 17, wherein said substantially cross-shaped recess includes marks adapted to indicate the functions of the respective integral key elements.

19. A controller unit according to claim 18, wherein said substantially cross-shaped recess is centrally processed to identify its center.

20. A controller unit according to claim 16, wherein said substantially cross-shaped recess includes marks adapted to indicate the functions of the respective integral key elements.

21. A controller unit according to claim 16, wherein said substantially cross-shaped recess is centrally processed to identify its center.

22. A controller unit according to claim 13 further comprising a plurality of further key elements, said key elements including different marks or colors to indicate functions.

* * * * *